United States Patent
Gwidt et al.

(10) Patent No.: US 10,001,073 B2
(45) Date of Patent: Jun. 19, 2018

(54) SYSTEMS AND METHODS FOR MULTIPLE CATALYST LIGHT OFF EVENTS DURING DRIVE CYCLE

(71) Applicant: GM Global Technology Operations LLC, Detroit, MI (US)

(72) Inventors: J. Michael Gwidt, Brighton, MI (US); Robert E. Heger, Bloomfield Hills, MI (US); Robert J. Genslak, Macomb, MI (US); Stephen P. Levijoki, Swartz Creek, MI (US); Edward Stuteville, Linden, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 72 days.

(21) Appl. No.: 15/164,142

(22) Filed: May 25, 2016

(65) Prior Publication Data

US 2017/0342924 A1    Nov. 30, 2017

(51) Int. Cl.
| | |
|---|---|
| *F02D 41/02* | (2006.01) |
| *B60W 20/16* | (2016.01) |
| *B60K 6/24* | (2007.10) |
| *B60W 10/06* | (2006.01) |
| *B60W 10/08* | (2006.01) |
| *F01N 3/20* | (2006.01) |
| *F01N 11/00* | (2006.01) |
| *F02D 41/26* | (2006.01) |

(Continued)

(52) U.S. Cl.
CPC ........... *F02D 41/0255* (2013.01); *B60K 6/24* (2013.01); *B60W 10/06* (2013.01); *B60W 10/08* (2013.01); *B60W 20/16* (2016.01); *F01N 3/2033* (2013.01); *F01N 11/002* (2013.01); *F02D 41/26* (2013.01); *F02N 11/0814* (2013.01); *F02P 5/045* (2013.01); *F02P 5/1506* (2013.01); *B60W 2540/10* (2013.01); *B60Y 2200/92* (2013.01); *B60Y 2300/474* (2013.01); *F01N 2550/02* (2013.01); *Y10S 903/905* (2013.01)

(58) Field of Classification Search
None
See application file for complete search history.

(56) References Cited

U.S. PATENT DOCUMENTS

| | | | | |
|---|---|---|---|---|
| 3,813,877 | A  * | 6/1974 | Hunt ..................... | F02D 9/00 261/41.5 |
| 6,397,963 | B1 * | 6/2002 | Lennevi ................ | B60K 6/365 180/65.235 |

(Continued)

*Primary Examiner* — Redhwan K Mawari
*Assistant Examiner* — Edward Torchinsky (57) ABSTRACT

A catalyst control system includes a stop and start module that, during a period that the vehicle is ON between (i) a first time when the vehicle is turned ON and (i) a second time when the vehicle is next turned OFF, selectively shuts down and starts a spark ignition engine of the vehicle. A catalyst light off (CLO) control module initiates a first CLO event for a first engine startup during the period and, when a temperature of a catalyst that receives exhaust output by the engine is less than a predetermined temperature, selectively initiates a second CLO event for a second engine startup during the period. A fuel control module richens fueling of the engine during the first and second CLO events of the period. A spark control module retards spark timing of the engine during the first and second CLO events of the period.

16 Claims, 4 Drawing Sheets

(51) Int. Cl.
*F02N 11/08* (2006.01)
*F02P 5/04* (2006.01)
*F02P 5/15* (2006.01)

(56) References Cited

U.S. PATENT DOCUMENTS

| | | | |
|---|---|---|---|
| 8,583,349 B2 * | 11/2013 | Anilovich | F01N 11/00 60/277 |
| 8,997,457 B2 * | 4/2015 | Leone | F02D 9/04 60/284 |
| 9,771,888 B2 * | 9/2017 | Packard | F02D 43/00 |
| 2015/0107554 A1 * | 4/2015 | Packard | F02D 41/0235 123/350 |
| 2015/0275795 A1 * | 10/2015 | Cygan, Jr. | F02D 41/0255 701/102 |

* cited by examiner

SYSTEMS AND METHODS FOR MULTIPLE CATALYST LIGHT OFF EVENTS DURING DRIVE CYCLE

FIELD

The present disclosure relates to vehicle control systems and methods and more particularly to catalyst light off control systems and methods.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Air is drawn into an engine through an intake manifold. A throttle valve controls airflow into the engine. The air mixes with fuel from one or more fuel injectors to form an air/fuel mixture. The air/fuel mixture is combusted within one or more cylinders of the engine. Combustion of the air/fuel mixture may be initiated by, for example, injection of the fuel or spark provided by a spark plug.

Combustion of the air/fuel mixture produces torque and exhaust gas. Torque is generated via heat release and expansion during combustion of the air/fuel mixture. The engine transfers torque to a transmission via a crankshaft, and the transmission transfers torque to one or more wheels via a driveline. The exhaust gas is expelled from the cylinders to an exhaust system.

An engine control module (ECM) controls the torque output of the engine. The ECM may control the torque output of the engine based on driver inputs and/or other inputs. The ECM may modify how and when fuel and/or spark is provided to the cylinders for one or more events. The ECM retards the spark timings and provides fuel to the cylinders in two separate injections to during a catalyst light off event.

SUMMARY

In a feature, a catalyst control system of a vehicle is described. A stop and start module, during a period that the vehicle is ON between (i) a first time when the vehicle is turned ON and (i) a second time when the vehicle is next turned OFF, selectively shuts down and starts a spark ignition engine of the vehicle. A catalyst light off (CLO) control module initiates a first CLO event for a first engine startup during the period and, when a temperature of a catalyst that receives exhaust output by the engine is less than a predetermined temperature, selectively initiates a second CLO event for a second engine startup during the period. A fuel control module richens fueling of the engine during the first CLO event of the period and richens fueling of the engine during the second CLO event of the period. A spark control module retards spark timing of the engine during the first CLO event of the period and that retards the spark timing of the engine during the second CLO event of the period.

In further features, the CLO control module initiates the second CLO event during the period when the temperature of the catalyst is less than the predetermined temperature and a temperature of engine coolant is within a predetermined temperature range.

In further features, the CLO control module initiates the second CLO event during the period when the temperature of the catalyst is less than the predetermined temperature and an ambient air pressure is less than a predetermined pressure.

In further features, the CLO control module initiates the second CLO event during the period when the temperature of the catalyst is less than the predetermined temperature, a temperature of engine coolant is within a predetermined temperature range, and an ambient air pressure is less than a predetermined pressure.

In further features, a hybrid control module controls torque output of an electric motor based on a driver torque request while the engine is shut down during the period that the vehicle is ON.

In further features, the CLO control module ends the second CLO event when the temperature of the catalyst is greater than a second predetermined temperature.

In further features, the CLO control module ends the second CLO event when a period of the engine running after the initiation of the second CLO event is greater than a predetermined period.

In further features, an age adjustment module determines an adjustment for aging of the catalyst. The CLO control module increases the predetermined period based on the adjustment.

In further features, a fuel adjustment module determines an adjustment based on an ethanol content of fuel of the engine. The CLO control module increases the predetermined period based on the adjustment.

In further features, in response to an ending of the first CLO event and before the initiation of the second CLO event during the period: the fuel control module leans fueling of the engine relative to the fueling enrichment of the first CLO event; and the spark control module advances the spark timing relative to the spark timing retardation of the first CLO event.

In a feature, a catalyst control method for a vehicle includes: during a period that the vehicle is ON between (i) a first time when the vehicle is turned ON and (i) a second time when the vehicle is next turned OFF, selectively shutting down and starting a spark ignition engine of the vehicle; initiating a first catalyst light off (CLO) event for a first engine startup during the period; when a temperature of a catalyst that receives exhaust output by the engine is less than a predetermined temperature, selectively initiating a second CLO event for a second engine startup during the period; richening fueling of the engine during the first CLO event of the period; richening fueling of the engine during the second CLO event of the period; retarding spark timing of the engine during the first CLO event of the period; and retarding the spark timing of the engine during the second CLO event of the period.

In further features, selectively initiating the second CLO event includes initiating the second CLO event during the period when the temperature of the catalyst is less than the predetermined temperature and a temperature of engine coolant is within a predetermined temperature range.

In further features, selectively initiating the second CLO event includes initiating the second CLO event during the period when the temperature of the catalyst is less than the predetermined temperature and an ambient air pressure is less than a predetermined pressure.

In further features, selectively initiating the second CLO event includes initiating the second CLO event during the period when the temperature of the catalyst is less than the predetermined temperature, a temperature of engine coolant is within a predetermined temperature range, and an ambient air pressure is less than a predetermined pressure.

In further features, the catalyst control method further includes controlling torque output of an electric motor based on a driver torque request while the engine is shut down during the period that the vehicle is ON.

In further features, the catalyst control method further includes ending the second CLO event when the temperature of the catalyst is greater than a second predetermined temperature.

In further features, the catalyst control method further includes ending the second CLO event when a period of the engine running after the initiation of the second CLO event is greater than a predetermined period.

In further features, the catalyst control method further includes: determining an adjustment for aging of the catalyst; and increasing the predetermined period based on the adjustment.

In further features, the catalyst control method further includes: determining an adjustment based on an ethanol content of fuel of the engine; and increasing the predetermined period based on the adjustment.

In further features, the catalyst control method further includes, in response to an ending of the first CLO event and before the initiation of the second CLO event during the period: leaning fueling of the engine relative to the fueling enrichment of the first CLO event; and advancing the spark timing relative to the spark timing retardation of the first CLO event.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An engine control module (ECM) controls fuel and spark to cylinders of an engine. The ECM controls how much fuel is supplied to a given cylinder, when the fuel is supplied to the cylinder, and spark timing used to initiate combustion within the cylinder. The ECM also controls starting and shutting down of the engine.

A catalyst (e.g., a three-way catalyst or a four-way catalyst) receives exhaust output by the engine. A conversion efficiency of the catalyst may refer to the ability of the catalyst to react with one or more exhaust constituents. The conversion efficiency of the catalyst is related to temperature of the catalyst. For example, the conversion efficiency of the catalyst decreases as the temperature of the catalyst decreases, and the conversion efficiency of the catalyst increases as the temperature of the catalyst increases.

The catalyst's conversion efficiency may therefore be low when the engine is started after the engine is off for a period of time. When the engine is started, the ECM may perform a catalyst light off (CLO) event to warm the catalyst and increase the catalyst's conversion efficiency.

To perform a CLO event, the ECM retards spark and richens fueling to provide more heat (than normal engine operation) to the catalyst. While the engine runs after the CLO event, the catalyst remains warm, for example, via heat from the engine and reaction with exhaust constituents. As such, a next CLO event may be performed during a next drive cycle. A drive cycle may refer to the period between (i) when a startup of the vehicle is requested by a driver (e.g., via an ignition key, button, or switch) and (ii) when a driver next requests that the vehicle be shut down (e.g., via the ignition key, button, or switch).

Some types of vehicles, the ECM selectively shuts down and starts the engine during a drive cycle. For example, an electric motor may be used for vehicle propulsion and stopping while the engine is shut down. According to the present disclosure, the ECM may perform more than one CLO event during a drive cycle. Performance of multiple CLO events during a drive cycle may increase fuel consumption, but may decrease vehicle emissions.

Figure 1:
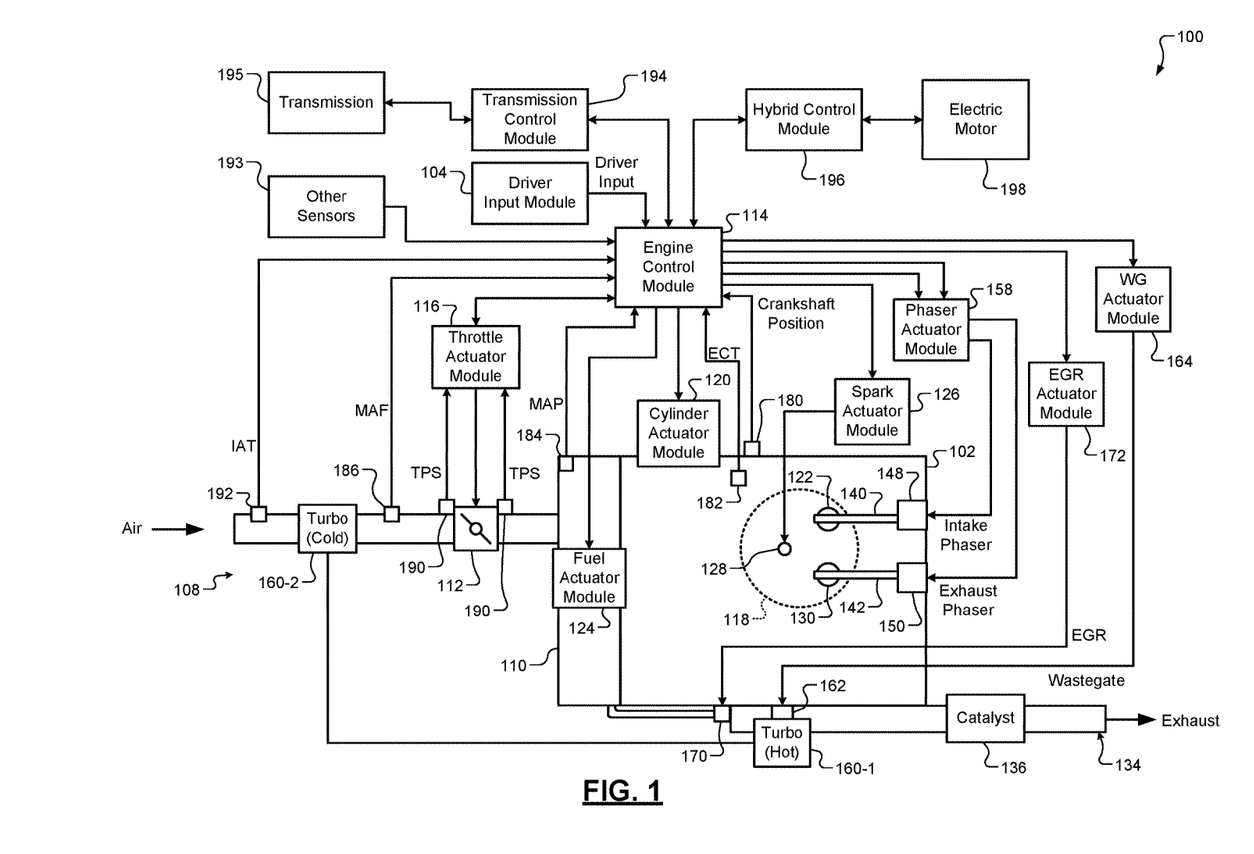
FIG. 1 is a functional block diagram of an example engine system.

Referring now to FIG. 1, a functional block diagram of an example engine system 100 is presented. The engine system 100 of a vehicle includes an engine 102 that combusts an air/fuel mixture to produce torque based on driver input from a driver input module 104.

Air is drawn into the engine 102 through an intake system 108. The intake system 108 may include an intake manifold 110 and a throttle valve 112. For example only, the throttle valve 112 may include a butterfly valve having a rotatable blade. An engine control module (ECM) 114 controls a throttle actuator module 116, and the throttle actuator module 116 regulates opening of the throttle valve 112 to control airflow into the intake manifold 110.

Air from the intake manifold 110 is drawn into cylinders of the engine 102. While the engine 102 includes multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders under some circumstances, as discussed further below, which may improve fuel efficiency.

The engine 102 may operate using a four-stroke cycle or another suitable engine cycle. The four strokes of a four-stroke cycle, described below, will be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes. For four-stroke engines, one engine cycle may correspond to two crankshaft revolutions.

When the cylinder 118 is activated, air from the intake manifold 110 is drawn into the cylinder 118 through an intake valve 122 during the intake stroke. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers/ports associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression causes ignition of the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. Some types of engines, such as homogenous charge compression ignition (HCCI) engines may perform both compression ignition and spark ignition. The timing of the spark may be specified relative to the time when the piston is at its topmost position, which will be referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with the position of the crankshaft. The spark actuator module 126 may disable provision of spark to deactivated cylinders or provide spark to deactivated cylinders.

During the combustion stroke, the combustion of the air/fuel mixture drives the piston down, thereby driving the crankshaft. The combustion stroke may be defined as the time between the piston reaching TDC and the time when the piston returns to a bottom most position, which will be referred to as bottom dead center (BDC).

During the exhaust stroke, the piston begins moving up from BDC and expels the byproducts of combustion through an exhaust valve 130. The byproducts of combustion are exhausted from the vehicle via an exhaust system 134. The exhaust system 134 includes a catalyst 136, such as a three-way catalyst (TWC) or a four-way catalyst. The catalyst 136 reacts with components of the exhaust, such as nitrogen oxides (NOx), carbon monoxide (CO), Carbon dioxide ($CO_2$), etc.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). While camshaft based valve actuation is shown and has been discussed, camless valve actuators may be implemented. While separate intake and exhaust camshafts are shown, one camshaft having lobes for both the intake and exhaust valves may be used.

The cylinder actuator module 120 may deactivate the cylinder 118 by disabling opening of the intake valve 122 and/or the exhaust valve 130. The time when the intake valve 122 is opened may be varied with respect to piston TDC by an intake cam phaser 148. The time when the exhaust valve 130 is opened may be varied with respect to piston TDC by an exhaust cam phaser 150. A phaser actuator module 158 may control the intake cam phaser 148 and the exhaust cam phaser 150 based on signals from the ECM 114.

In various implementations, cam phasing may be omitted. Variable valve lift (not shown) may also be controlled by the phaser actuator module 158. In various other implementations, the intake valve 122 and/or the exhaust valve 130 may be controlled by actuators other than a camshaft, such as electromechanical actuators, electrohydraulic actuators, electromagnetic actuators, etc.

The engine system 100 may include one or more boost devices, such as a turbocharger or a supercharger, that provide(s) pressurized air to the intake manifold 110. For example, FIG. 1 shows a turbocharger including a turbocharger turbine 160-1 that is driven by exhaust gases flowing through the exhaust system 134. The turbocharger also includes a turbocharger compressor 160-2 that is driven by the turbocharger turbine 160-1 and that compresses air leading into the throttle valve 112. As discussed further below, the engine system 100 may include more than one boost device, such as sequential or parallel turbochargers.

A wastegate 162 controls exhaust flow through and bypassing the turbocharger turbine 160-1. Wastegates can also be referred to as (turbocharger) turbine bypass valves. The wastegate 162 may allow exhaust to bypass the turbocharger turbine 160-1 to reduce intake air compression provided by the turbocharger. The ECM 114 may control the turbocharger via a wastegate actuator module 164. The wastegate actuator module 164 may modulate the boost of the turbocharger by controlling an opening of the wastegate 162. In various implementations, multiple turbochargers may be controlled by the wastegate actuator module 164. The turbocharger(s) may have variable geometry, which may be controlled by a turbo actuator module (not shown).

A cooler (e.g., a charge air cooler or an intercooler) may dissipate some of the heat contained in the compressed air charge, which may be generated as the air is compressed. Although shown separated for purposes of illustration, the turbocharger turbine 160-1 and the turbocharger compressor 160-2 may be mechanically linked to each other, placing intake air in close proximity to hot exhaust. The compressed air charge may absorb heat from components of the exhaust system 134.

The engine system 100 may include an exhaust gas recirculation (EGR) valve 170, which selectively redirects exhaust gas back to the intake manifold 110. The EGR valve 170 may be located upstream of the turbocharger turbine 160-1. The EGR valve 170 may be controlled by an EGR actuator module 172.

Crankshaft position may be measured using a crankshaft position sensor 180. An engine speed may be determined based on the crankshaft position measured using the crankshaft position sensor 180. A temperature of engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

Position of the throttle valve 112 may be measured using one or more throttle position sensors (TPS) 190. A temperature of air being drawn into the engine 102 may be measured using an intake air temperature (IAT) sensor 192. The engine system 100 may also include one or more other sensors 193. The other sensors 193 may include, for example, an oxygen sensor located upstream of the catalyst 136, an oxygen sensor located downstream of the catalyst 136, an ambient air pressure sensor, and/or other suitable sensors. The oxygen sensor upstream of the catalyst 136 measures an amount of oxygen flowing into the catalyst 136. The oxygen sensor located downstream of the catalyst 136 measures an amount of oxygen flowing out of the catalyst 136. The ECM 114 may use signals from the sensors to make control decisions for the engine system 100.

The other sensors 193 include an accelerator pedal position (APP) sensor, may include a clutch pedal position (CPP) sensor (e.g., in the case of a manual transmission), and may include one or more other types of sensors. An APP sensor measures a position of an accelerator pedal within a passenger cabin of the vehicle. A CPP sensor measures a position of a clutch pedal within the passenger cabin of the vehicle. The other sensors 193 may also include one or more acceleration sensors that measure longitudinal acceleration of the vehicle.

The ECM 114 may communicate with a transmission control module 194, for example, to coordinate engine operation with gear shifts in a transmission 195. For example, the ECM 114 may reduce engine torque during a gear shift.

The ECM 114 may communicate with a hybrid control module 196, for example, to coordinate operation of the engine 102 and an electric motor 198. The electric motor 198 may also function as a generator, and may be used to produce electrical energy for use by vehicle electrical systems and/or for storage in a battery. While only the electric motor 198 is shown and discussed, multiple electric motors may be implemented. In various implementations, various functions of the ECM 114, the transmission control module 194, and the hybrid control module 196 may be integrated into one or more modules.

The ECM 114 starts and shuts down the engine 102 between times when the vehicle is started and when the vehicle is next shut down. A user may start the vehicle, for example, by actuating an ignition key, button, or switch. A user may shut down the vehicle, for example, by actuating the ignition key, button, or switch.

The electric motor 198 may be coupled to the transmission 195 and used for vehicle propulsion and stopping. For example, in some types of vehicles, the engine 102 may be operated only to generate power for the electric motor 198 (e.g., when a state of charge of a battery pack of the vehicle falls below a predetermined state of charge), and the electric motor 198 may be used at all times for vehicle propulsion. In other types of vehicles, the electric motor 198 may be used for vehicle propulsion at times when the engine 102 is shut down and at times when the engine 102 is running (e.g., to supplement engine torque output).

Each system that varies an engine parameter may be referred to as an engine actuator. Each engine actuator has an associated actuator value. For example, the throttle actuator module 116 may be referred to as an engine actuator, and the throttle opening area may be referred to as the actuator value. In the example of FIG. 1, the throttle actuator module 116 achieves the throttle opening area by adjusting an angle of the blade of the throttle valve 112.

The spark actuator module 126 may also be referred to as an engine actuator, while the corresponding actuator value may be the amount of spark timing. Other engine actuators may include the cylinder actuator module 120, the fuel actuator module 124, the phaser actuator module 158, the wastegate actuator module 164, and the EGR actuator module 172. For these engine actuators, the actuator values may correspond to a cylinder activation/deactivation sequence, fueling rate, intake and exhaust cam phaser angles, target wastegate opening, and EGR valve opening, respectively. The ECM 114 may control the actuator values in order to cause the engine 102 to generate a requested engine output torque.

Figure 2:
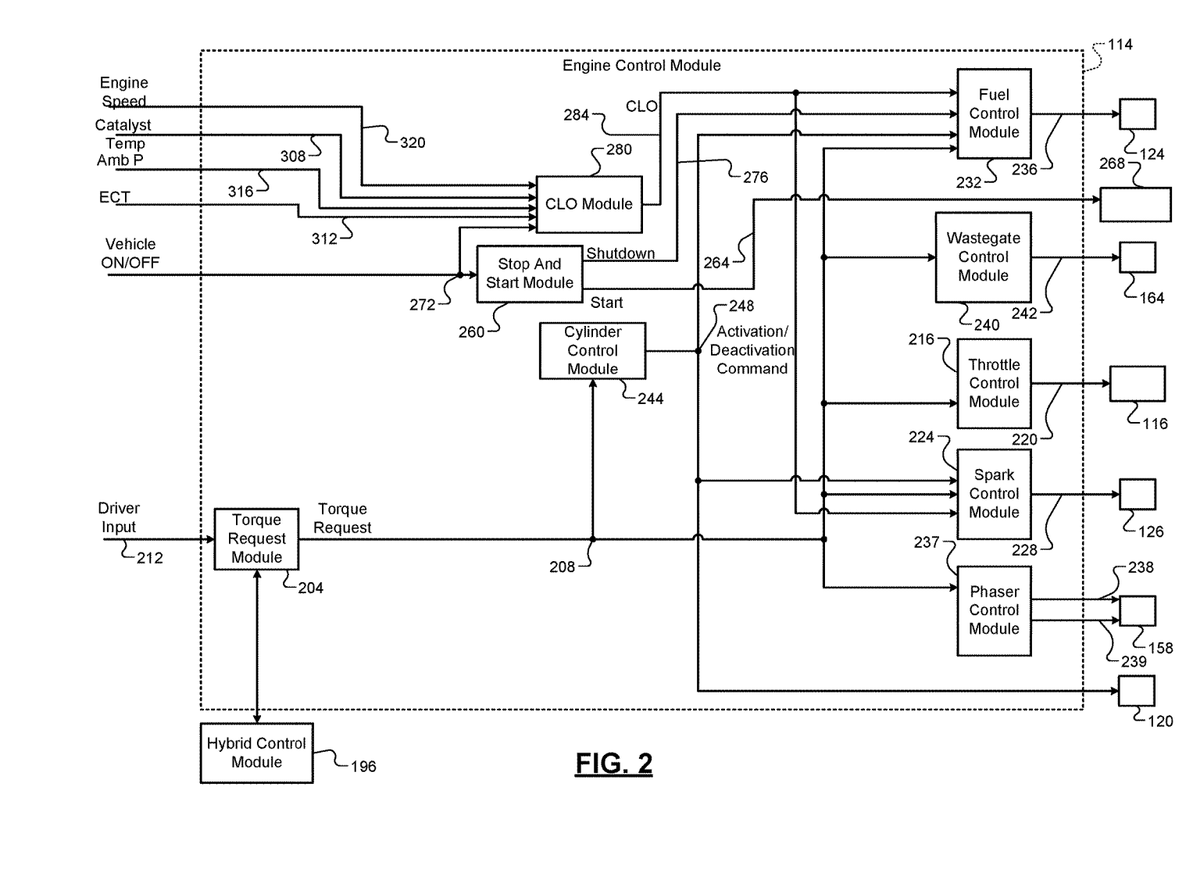
FIG. 2 is a functional block diagram of an example engine control system.

Referring now to FIG. 2, a functional block diagram of an example engine control system is presented. A torque request module 204 determines a torque request 208 for the engine 102 based on one or more driver inputs 212. The driver inputs 212 may include, for example, an accelerator pedal position, a brake pedal position, a cruise control input, and/or one or more other suitable driver inputs. For example, the torque request 208 may increase as the accelerator pedal position increases (relative to a predetermined resting accelerator pedal position, such as zero) and vice versa. The torque request module 204 may determine the torque request 208 additionally or alternatively based on one or more other torque requests, such as torque requests generated by the ECM 114 and/or torque requests received from other modules of the vehicle, such as the transmission control module 194, the hybrid control module 196, a chassis control module, etc.

One or more engine actuators are controlled based on the torque request 208 and/or one or more other parameters. For example, a throttle control module 216 may determine a target throttle opening 220 based on the torque request 208. The throttle actuator module 116 may adjust opening of the throttle valve 112 based on the target throttle opening 220.

A spark control module 224 determines a target spark timing 228 based on the torque request 208. The spark actuator module 126 generates spark based on the target spark timing 228. A fuel control module 232 determines one or more target fueling parameters 236 based on the torque request 208. For example, the target fueling parameters 236 may include fuel injection amount, number of fuel injections for injecting the amount, and timing for each of the injections. The fuel actuator module 124 injects fuel based on the target fueling parameters 236.

A phaser control module 237 determines target intake and exhaust cam phaser angles 238 and 239 based on the torque request 208. The phaser actuator module 158 may regulate the intake and exhaust cam phasers 148 and 150 based on the target intake and exhaust cam phaser angles 238 and 239, respectively.

A wastegate control module 240 sets a target wastegate opening 242 based on the torque request 208. The wastegate actuator module 164 controls opening of the wastegate 162 based on the target wastegate opening 242. For example only, the wastegate actuator module 164 may determine a target duty cycle (DC) to apply to the wastegate 162 based on the target wastegate opening 242 using a function or mapping that relates target wastegate openings to target DCs. The wastegate actuator module 164 may apply a signal to the wastegate 162 based on the target DC.

A cylinder control module 244 generates an activation/deactivation command 248 for a next cylinder in a predetermined firing order of the cylinders ("the next cylinder"). The activation/deactivation command 248 indicates whether the next cylinder should be activated or deactivated. For example only, the cylinder control module 244 may set the activation/deactivation command 248 to a first state (e.g., 1) when the next cylinder should be activated and set the activation/deactivation command 248 to a second state (e.g., 0) when the next cylinder should be deactivated. While the activation/deactivation command 248 is and will be discussed as being generated for the next cylinder in the predetermined firing order, the activation/deactivation command 248 may be generated for a second cylinder immediately following the next cylinder in the predetermined firing order, a third cylinder immediately following the second cylinder in the predetermined firing order, or another cylinder following the next cylinder in the predetermined firing order.

The cylinder actuator module 120 deactivates the intake and exhaust valves of the next cylinder when the activation/deactivation command 248 indicates that the next cylinder should be deactivated. The cylinder actuator module 120 allows opening and closing of the intake and exhaust valves of the next cylinder when the activation/deactivation command 248 indicates that the next cylinder should be activated.

The fuel control module 232 halts fueling of the next cylinder when the activation/deactivation command 248 indicates that the next cylinder should be deactivated. The fuel control module 232 sets the target fueling parameters 236 to provide fuel to the next cylinder when the activation/deactivation command 248 indicates that the next cylinder should be activated. The spark control module 224 may provide spark to the next cylinder when the activation/deactivation command 248 indicates that the next cylinder should be activated. The spark control module 224 may provide or halt spark to the next cylinder when the activation/deactivation command 248 indicates that the next cylinder should be deactivated.

Cylinder deactivation is different than fuel cutoff (e.g., deceleration fuel cutoff). When a cylinder is deactivated, the cylinder's intake and exhaust valves are maintained closed. When fuel is cutoff to a cylinder, the cylinder's intake and exhaust valves may still be opened and closed.

The cylinder control module 244 may generate the activation/deactivation command 248 based on a target firing fraction. A numerator of the target firing fraction corresponds to a target number of cylinders to be activated (M) out of the next N cylinders in the predetermined firing order of the cylinders, and N is the denominator of the target firing fraction. For example, a target firing fraction of ⅝ indicates that 5 of the next 8 cylinders in the predetermined firing order should be activated. In this example, 3 of the next 8 cylinders in the predetermined firing order should therefore be deactivated. A target firing fraction of 0 corresponds to all of the cylinders of the engine 102 being deactivated (and 0 being activated), and a target firing fraction of 1 corresponds to all of the cylinders of the engine 102 being activated (and 0 being deactivated). The cylinder control module 244 may determine the target firing fraction, for example, based on the torque request 208 and/or one or more other vehicle operating parameters.

A stop and start module 260 selectively starts and shuts down the engine 102. For example, in some vehicles, the stop and start module 260 may start the engine 102 when the vehicle is requested to be ON, such as via actuation of an ignition key, button, or switch. In other types of vehicles the stop and start module 260 may leave the engine 102 OFF when the vehicle is requested to be ON and start the engine 102 later while the vehicle is still to be ON. The stop and start module 260 generates a start signal 264 to start the engine 102. A starter 268 engages the engine 102 and drives rotation of the engine 102 in response to the start signal 264.

A vehicle ON/OFF signal 272 may indicate whether the vehicle is requested to be ON or OFF. For example, the vehicle ON/OFF signal 272 may be set to a first state in response to user actuation of an ignition key, button, or switch. The vehicle ON/OFF signal 272 may be set to a second state in response to the user actuation of the ignition key, button or switch. One drive cycle may be defined by the period between a first time when the vehicle is requested to be ON and a second (next) time when the vehicle is requested to be OFF.

If the engine 102 is running, the stop and start module 260 shuts down the engine 102 when the vehicle is requested to be OFF. Additionally, the stop and start module 260 may shut down and later start the engine 102 during a given drive cycle. For example, the stop and start module 260 may shut down the engine 102 during a drive cycle when a state of charge of an energy storage device (e.g., one or more batteries) is greater than a first predetermined value. The stop and start module 260 may later start the engine 102 during that drive cycle to recharge the energy storage device when the state of charge falls below a second predetermined value. While the example of state of charge based engine shutdown and start has been provided, the stop and start module 260 may shut down and/or start the engine 102 during a drive cycle under other circumstances.

The stop and start module 260 generates a shutdown signal 276 to shut down the engine 102. The fuel control module 232 disables fueling when the shutdown signal 276 is generated. The spark control module 224 may also disable spark when the shutdown signal 276 is generated. Disabling fueling of the engine 102 allows the engine 102 to slow to a stop.

A catalyst light off (CLO) module 280 (see also FIG. 3) selectively performs CLO events to warm the catalyst 136. The CLO control module 280 may transition a CLO signal 284 to a first state to initiate a CLO event. The CLO control module 280 may transition the CLO signal 284 from the first state to a second state to end a CLO event.

The spark control module 224 retards the spark timing during a CLO event. For example, the spark control module 224 may set the target spark timing 228 to a predetermined retarded spark timing during a CLO event. By retarding the spark timing, combustion begins later. More combustion heat may therefore be provided to the catalyst 136 to warm the catalyst 136 and increase the conversion efficiency of the catalyst 136. The fuel control module 232 may also richen fueling during a CLO event. For example, the fuel control module 232 may control fueling based on a predetermined rich air/fuel mixture that is more fuel rich than a stoichiometric air/fuel mixture during a CLO event. The fuel richening may be performed, for example, to achieve the torque request 208 despite the spark timing retardation.

The CLO control module 280 may perform a first CLO event for the first engine startup performed of a drive cycle. A temperature of the catalyst 136, however, may fall below a predetermined minimum catalyst temperature during a drive cycle when the engine 102 is OFF for a period after the first CLO event. According to the present disclosure, the CLO control module 280 may also perform one or more additional CLO events during the drive cycle. Performance of additional CLO events may increase fuel consumption during the drive cycle, but enables the catalyst 136 to achieve a higher conversion efficiency throughout the drive cycle.

Figure 3:
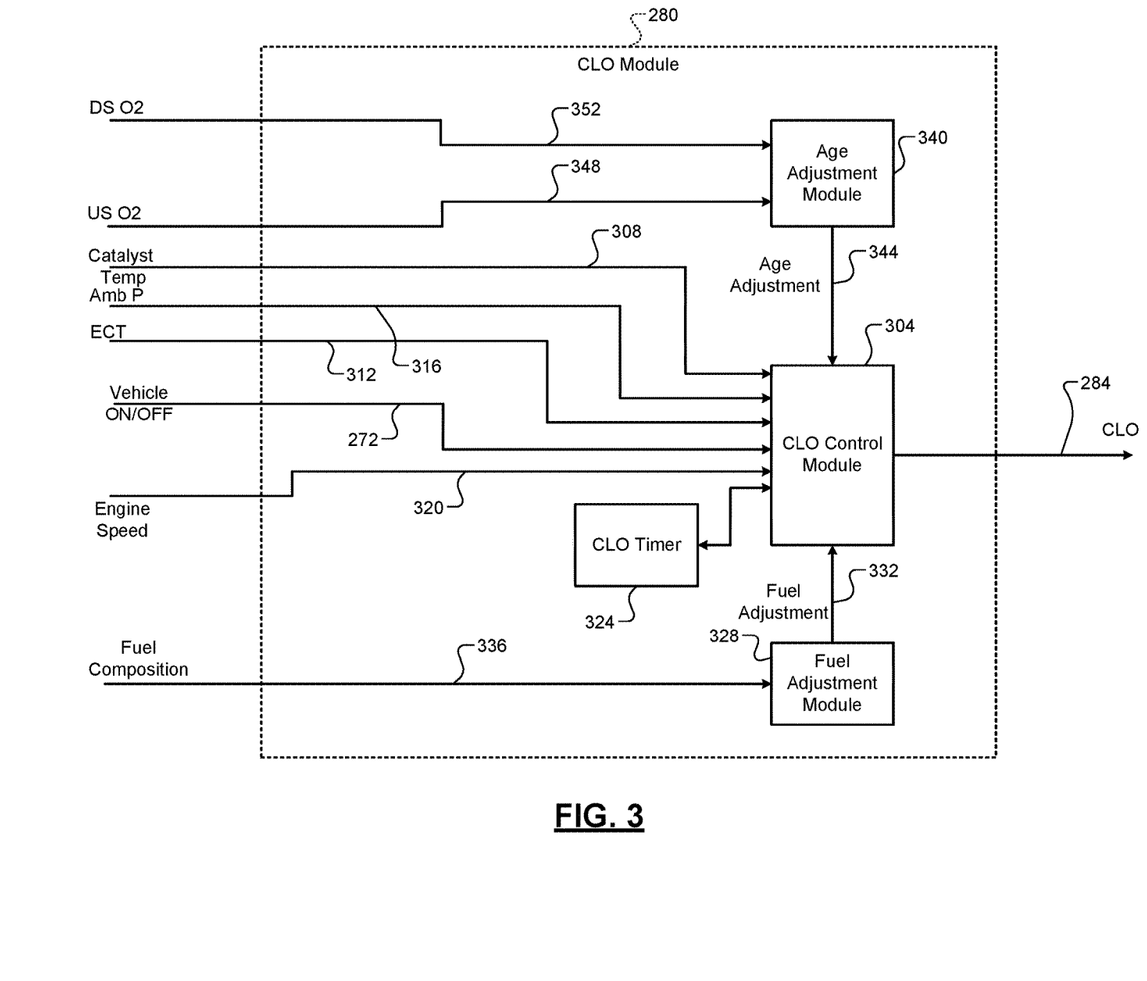
FIG. 3 is a functional block diagram of an example catalyst light off (CLO) module.

FIG. 3 is a functional block diagram of an example implementation of the CLO control module 280. A CLO control module 304 generates the CLO signal 284 to control performance of CLO events. The CLO control module 304 may perform multiple CLO events during a drive cycle. In some circumstances, such as when the catalyst 136 is still hot from a previous drive cycle when a next drive cycle begins, the CLO control module 304 may perform zero CLO events during the (next) drive cycle.

For each startup of the engine 102, including engine startups occurring after one or more other CLO events have already been performed during a drive cycle, the CLO control module 304 may determine whether to perform a CLO event. For a startup of the engine 102, the CLO control module 304 may determine whether one or more enabling conditions are satisfied for performing a CLO event. For example, the CLO control module 304 may initiate a CLO event for an engine startup when a catalyst temperature 308 is less than a first predetermined temperature and at least one of an engine coolant temperature (ECT) 312 is within a first predetermined temperature range and an ambient air pressure 316 is greater than a predetermined pressure. Additionally or alternatively, the CLO control module 304 may require that the catalyst temperature 308 be within a second predetermined temperature range.

The catalyst temperature 308 corresponds to a temperature of the catalyst 136. The catalyst temperature 308 may be measured using a sensor or determined based on one or more other measured parameters. The first predetermined temperature may correspond to a temperature of the catalyst 136 where the catalyst 136 achieves at least a predetermined minimum conversion efficiency. For example only, the first predetermined temperature may be approximately 150 degrees Celsius or another suitable temperature above which the catalyst 136 achieves at least the predetermined minimum conversion efficiency.

The second predetermined temperature range may correspond to predetermined minimum and maximum possible catalyst temperatures for performing a CLO event. The predetermined minimum temperature may be less than the predetermined temperature.

The ECT 312 may be measured using the ECT sensor 182. The ambient air pressure 316 may be, for example, measured using the ambient air pressure sensor. The lower limit of the first predetermined temperature range may be set based on an ECT temperature below which performance of a CLO event may cause the engine 102 to stall. The upper limit of the first predetermined temperature range may be set based on an ECT temperature above which combustion may be improper, such as resulting in knock, misfire, ringing, etc. For example only, the first predetermined temperature range may be approximately −12 degrees Celsius to approximately 90 degrees Celsius or another suitable range.

The predetermined pressure may correspond to a pressure below above-which insufficient oxygen may be present in intake air for performance of a CLO event. For example only, the predetermined pressure may be approximately 72 Kilopascals (KPa) or another suitable pressure. In various implementations, distance above sea level may be used in place of the ambient air pressure 316, and CLO events may be initiated when height above sea level is less than a predetermined height, such as approximately 10,000 feet above sea level.

A startup of the engine 102 may be indicated, for example, by the start signal 264 or an engine speed 320 becoming greater than a predetermined startup speed. For example only, the predetermined startup speed may be approximately 500 revolutions per minute (RPM) or another suitable speed. The engine speed 320 may be determined, for example, based on crankshaft position measured using the crankshaft position sensor 180.

When a startup of the engine 102 occurs, the CLO control module 304 may determine whether the engine 102 was shut down during performance of the last CLO event before the last CLO event completed. When the last CLO event was not completed, the CLO control module 304 may continue the last CLO event. The CLO control module 304 may or may not require that the one or more enabling conditions be satisfied before continuing the last CLO event.

The CLO control module 304 may deem a CLO event complete and end the CLO event, for example, when the catalyst temperature 308 is greater than a second predetermined temperature and/or a length (period) of the CLO event is greater than a predetermined period. The second predetermined temperature is greater than the first predetermined temperature and may be approximately 300 degrees Celsius or another suitable temperature that is greater than the first predetermined temperature.

The CLO control module 304 may reset a CLO timer 324 when the CLO control module 304 initiates a CLO event. The CLO control module 304 increments the CLO timer 324 as time passes during the performance of that CLO event. As such, the CLO timer 324 tracks the period of performance of the CLO event.

The CLO control module 304 may deem a CLO event complete and end the CLO event when the catalyst temperature 308 is greater than the second predetermined temperature and/or the period tracked by the CLO timer 324 is greater than the predetermined period. The predetermined period may be set based on a period of a CLO event to raise the catalyst temperature 308 to at least the second predetermined temperature.

The CLO control module 304 may increase the predetermined period under some circumstances. For example, the CLO control module 304 may increase the predetermined period based on aging of the catalyst 136 (relative to new) and/or a composition of the fuel provided to the engine 102.

A fuel adjustment module 328 may determine a fuel adjustment 332 for the predetermined period based on a composition (e.g., ethanol content) 336 of the fuel. For example, the fuel adjustment module 328 may determine the fuel adjustment 332 using a function or a lookup table that relates fuel compositions (e.g.t, ethanol concentrations) to adjustments for the predetermined period. The fuel adjustment 332 may increase (to further increase the predetermined period) as the ethanol content increases and vice versa. The composition 336 may be measured using a sensor (e.g., an ethanol sensor) or determined based on one or more engine operating parameters. The CLO control module 304 may increase (or maintain) the predetermined period based on the fuel adjustment 332.

An age adjustment module 340 may determine an aging adjustment 344 for the predetermined period based on aging of the catalyst 136. To determine an aging value for the catalyst 136, fueling may be transitioned from a predetermined lean air/fuel ratio to a predetermined rich air/fuel ratio and vice versa. The age adjustment module 340 may determine the aging value based on a period between (i) when upstream oxygen (US 02) 348 measured using the oxygen sensor upstream (e.g., at the input) of the catalyst 136 indicates a transition and (ii) when downstream oxygen (DS 02) 352 measured using the oxygen sensor downstream (e.g., at the output) of the catalyst 136 indicates the transition. This period is related to the ability of the catalyst 136 to react with exhaust. The age adjustment module 340 may determine the aging adjustment 344, for example, using a function or a lookup table that relates aging values to aging adjustments for the predetermined period.

Figure 4:
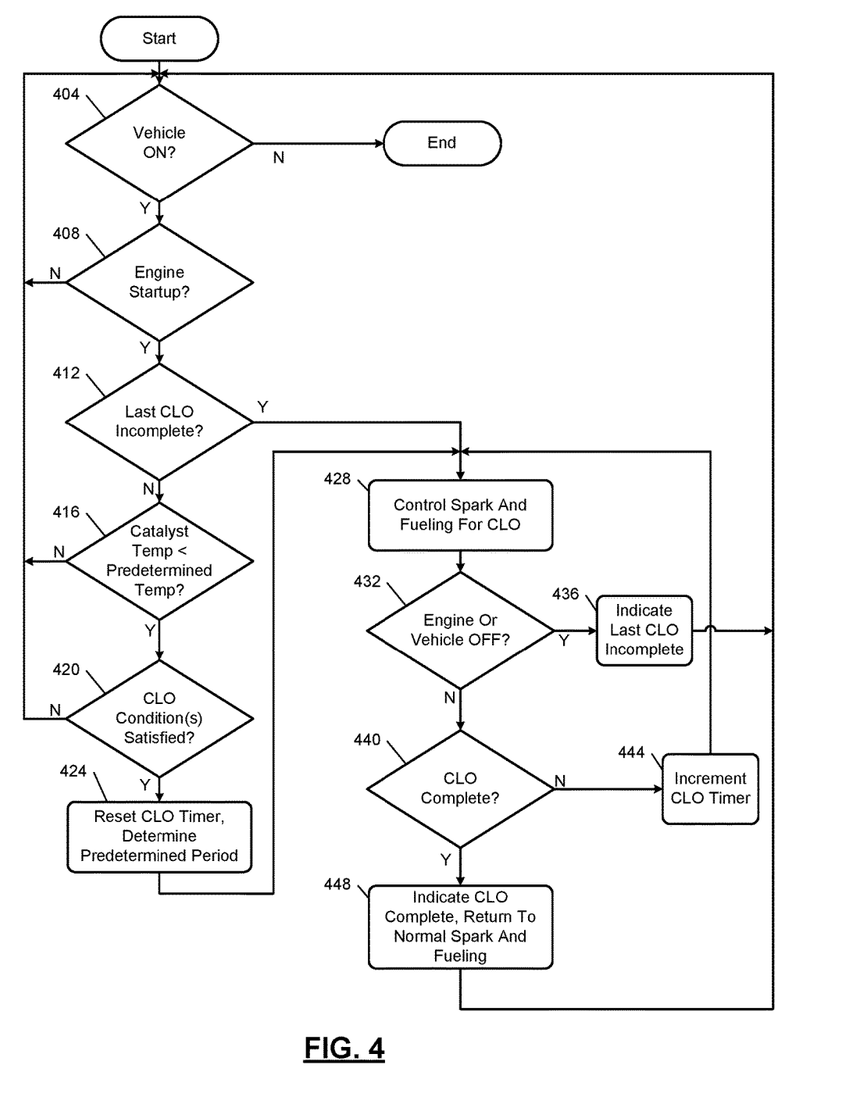
FIG. 4 is a flowchart depicting an example method of performing CLO events.

FIG. 4 is a flowchart depicting an example method of performing CLO events. Control may begin when the vehicle is ON and the engine 102 is OFF. The hybrid control module 196 may be controlling propulsion of the vehicle using the electric motor 198. At 404, the CLO control module 304 may determine whether the vehicle is still requested to be ON. A driver may turn the vehicle ON and OFF, for example, by actuating an ignition key, button, or switch. If 404 is true, control continues with 408. If 404 is false, control may end and the vehicle may shut down.

At 408, the CLO control module 304 may determine whether a startup of the engine 102 has occurred. For example, CLO control module 304 may determine whether the engine speed 320 has become greater than the predetermined speed or the start signal 264 has been received. If 408 is true, control continues with 412. If 408 is false, control may return to 404.

The CLO control module 304 may determine whether the last CLO event that was started was not completed at 412. If 412 is false (i.e., the last CLO event was completed), control may continue with 416. If 412 is true, control may transfer to 428 to continue that CLO event. Alternatively, if 412 is true, control may transfer to 420, which is discussed further below.

At 416, the CLO control module 304 may determine whether the catalyst temperature 308 is less than the first predetermined temperature. If 416 is true, control may continue with 420. If 416 is false, control may return to 404. The first predetermined temperature may correspond to a temperature where the catalyst 136 achieves the predetermined minimum conversion efficiency.

The CLO control module 304 may determine whether the enabling condition(s) for performing a CLO event are satisfied at 420. For example, the CLO control module 304 may determine whether the ECT 312 is within the first predetermined temperature range, the ambient air pressure 316 is less than the predetermined pressure, and/or the catalyst temperature 308 is within the second predetermined temperature range. If 420 is true, control may continue with 424. If 420 is false, control may return to 404.

At 420, the CLO control module 304 may reset the CLO timer 324 and determine the predetermined period for the CLO event. For example, the CLO control module 304 set the predetermined period to a fixed predetermined period. The CLO control module 304 may, however, increase the predetermined period based on the fuel adjustment 332 and/or the age adjustment 344. Control continues with 428.

At 428, the spark control module 224 retards the spark timing for the CLO event and the fuel control module 232 richens fueling for the CLO event. At 432, the CLO control module 304 may determine whether the engine 102 or the vehicle is to be OFF. For example, the CLO control module 304 may determine whether the shutdown signal 276 has been received or if the driver has requested that the vehicle be shut down via, for example, the ignition key, button, or switch. If 432 is true, control may store an indicator that performance of the CLO event was incomplete at 436, and control may return to 404. This indicator may be used at a next or later engine startup to identify that the last CLO event was incomplete. If 432 is false, control continue with 440.

At 440, the CLO control module 304 may determine whether the CLO event is complete. For example, the CLO control module 304 may determine whether the period tracked by the CLO timer 324 is greater than the predetermined period and/or the catalyst temperature 308 is greater than the second predetermined temperature. If 440 is true, the CLO control module 304 may indicate that the CLO event is complete (e.g., by transitioning the CLO signal 284 to the second state) at 448. The spark control module 224 and the fuel control module 232 may then resume normal control, such as by advancing the spark timing (relative to the retardation used during the CLO event) and leaning fueling (relative to the richening used during the CLO event). Control may then return to 404. In this manner, multiple CLO events may be performed during a single drive cycle. If 440 is false, the CLO control module 304 may increment the CLO timer 324 at 444, and control returns to 428 to continue the CLO event.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A catalyst control system of a vehicle, comprising:
   a stop and start module that, during a period that the vehicle is ON between (i) a first time when the vehicle is turned ON and (i) a second time when the vehicle is next turned OFF, selectively shuts down and starts a spark ignition engine of the vehicle;
   a catalyst light off (CLO) control module that initiates a first CLO event for a first engine startup during the period and that, when a temperature of a catalyst that receives exhaust output by the engine is less than a predetermined temperature, selectively initiates a second CLO event for a second engine startup during the period and that ends the second CLO event when a period of the engine running after the initiation of the second CLO event is greater than a predetermined period;
   an age adjustment module that:
      determines an aging value based on a period between:
         a first time when a first oxygen sensor located upstream of the catalyst indicates a transition in fueling; and
         a second time when a second oxygen sensor located downstream of the catalyst indicates the transition in fueling; and
      based on the aging value, determines an adjustment using one of a function and a lookup table that relates aging values to adjustments;
   wherein the CLO control module increases the predetermined period based on the adjustment,
   a fuel control module that richens fueling of the engine during the first CLO event of the period and that richens fueling of the engine during the second CLO event of the period; and
   a spark control module that retards spark timing of the engine during the first CLO event of the period and that retards the spark timing of the engine during the second CLO event of the period.

2. The catalyst control system of claim 1 wherein the CLO control module initiates the second CLO event during the period when the temperature of the catalyst is less than the predetermined temperature and a temperature of engine coolant is within a predetermined temperature range.

3. The catalyst control system of claim 1 wherein the CLO control module initiates the second CLO event during the period when the temperature of the catalyst is greater than the predetermined temperature and an ambient air pressure is less than a predetermined pressure.

4. The catalyst control system of claim 1 wherein the CLO control module initiates the second CLO event during the period when the temperature of the catalyst is greater than the predetermined temperature, a temperature of engine coolant is within a predetermined temperature range, and an ambient air pressure is less than a predetermined pressure.

5. The catalyst control system of claim 1 further comprising a hybrid control module that controls torque output of an electric motor based on a driver torque request while the engine is shut down during the period that the vehicle is ON.

6. The catalyst control system of claim 1 wherein the CLO control module ends the second CLO event when the temperature of the catalyst is greater than a second predetermined temperature.

7. The catalyst control system of claim 1 further comprising a fuel adjustment module that determines a second adjustment based on an ethanol content of fuel of the engine, wherein the CLO control module increases the predetermined period further based on the second adjustment.

8. The catalyst control system of claim 1 wherein, in response to an ending of the first CLO event and before the initiation of the second CLO event during the period:
the fuel control module leans fueling of the engine relative to the fueling enrichment of the first CLO event; and
the spark control module advances the spark timing relative to the spark timing retardation of the first CLO event.

9. A catalyst control method for a vehicle, comprising:
during a period that the vehicle is ON between (i) a first time when the vehicle is turned ON and (i) a second time when the vehicle is next turned OFF, selectively shutting down and starting a spark ignition engine of the vehicle;
initiating a first catalyst light off (CLO) event for a first engine startup during the period;
richening fueling of the engine during the first CLO event of the period;
retarding spark timing of the engine during the first CLO event of the period;
when a temperature of a catalyst that receives exhaust output by the engine is less than a predetermined temperature, selectively initiating a second CLO event for a second engine startup during the period;
richening fueling of the engine during the second CLO event of the period;
retarding the spark timing of the engine during the second CLO event of the period;
ending the second CLO event when a period of the engine running after the initiation of the second CLO event is greater than a predetermined period;
determining an aging value based on a period between:
a first time when a first oxygen sensor located upstream of the catalyst indicates a transition in fueling; and
a second time when a second oxygen sensor located downstream of the catalyst indicates the transition in fueling;
based on the aging value, determining an adjustment using one of a function and a lookup table that relates aging values to adjustments; and
increasing the predetermined period based on the adjustment.

10. The catalyst control method of claim 9 wherein selectively initiating the second CLO event includes initiating the second CLO event during the period when the temperature of the catalyst is less than the predetermined temperature and a temperature of engine coolant is within a predetermined temperature range.

11. The catalyst control method of claim 9 wherein selectively initiating the second CLO event includes initiating the second CLO event during the period when the temperature of the catalyst is greater than the predetermined temperature and an ambient air pressure is less than a predetermined pressure.

12. The catalyst control method of claim 9 wherein selectively initiating the second CLO event includes initiating the second CLO event during the period when the temperature of the catalyst is greater than the predetermined temperature, a temperature of engine coolant is within a predetermined temperature range, and an ambient air pressure is less than a predetermined pressure.

13. The catalyst control method of claim 9 further comprising controlling torque output of an electric motor based on a driver torque request while the engine is shut down during the period that the vehicle is ON.

14. The catalyst control method of claim 9 further comprising ending the second CLO event when the temperature of the catalyst is greater than a second predetermined temperature.

15. The catalyst control method of claim 9 further comprising:
determining a second adjustment based on an ethanol content of fuel of the engine; and
increasing the predetermined period further based on the second adjustment.

16. The catalyst control method of claim 9 further comprising, in response to an ending of the first CLO event and before the initiation of the second CLO event during the period:
leaning fueling of the engine relative to the fueling enrichment of the first CLO event; and
advancing the spark timing relative to the spark timing retardation of the first CLO event.

\* \* \* \* \*